United States Patent [19]
Turnbo et al.

[11] 3,923,958
[45] Dec. 2, 1975

[54] METHOD OF REMOVING AROMATIC COMPOUNDS OLEFINS, ACETYLENES AND CARBON MONOXIDE FROM FEED STREAMS

[75] Inventors: Roy G. Turnbo, Deer Park; Donald A. Keyworth, Houston, both of Tex.

[73] Assignee: Tenneco Chemicals, Inc., Saddle Brook, N.J.

[22] Filed: Mar. 27, 1973

[21] Appl. No.: 345,316

[52] U.S. Cl. ............. 423/245; 423/246; 260/438.1; 260/677 A; 260/679 A
[51] Int. Cl.² ................... B01D 53/34; C07C 11/00
[58] Field of Search ............ 423/246, 245; 252/358; 260/438.1, 677 A, 679 A

[56] References Cited
UNITED STATES PATENTS
3,651,159  3/1972  Long et al....................... 260/438.1

Primary Examiner—Earl C. Thomas
Attorney, Agent, or Firm—Evelyn Berlow

[57] ABSTRACT

Normal paraffinic hydrocarbons having from 5 to 25 carbon atoms are used to prevent or minimize the foaming that occurs when liquid sorbents that comprise bimetallic salt complexes having the generic formula $M_I M_{II} X_n$·Aromatic, wherein $M_I$ is a Group I-B metal, $M_{II}$ is a group III-A metal, X is halogen, n is the sum of the valences of $M_I$ and $M_{II}$, and Aromatic is a monocyclic aromatic compound having 6 to 12 carbon atoms, are brought into contact with large volumes of gases. The preferred anti-foaming agents for these processes are mineral oil and non-detergent motor oil.

10 Claims, No Drawings

METHOD OF REMOVING AROMATIC COMPOUNDS OLEFINS, ACETYLENES AND CARBON MONOXIDE FROM FEED STREAMS

This invention relates to antifoaming agents for use in liquid sorbents that comprise bimetallic salt complexes having the generic formula $M_I M_{II} X_n$.Aromatic, wherein $M_I$ is a Group I-B metal, $M_{II}$ is a Group III-A metal, X is halogen, n is the sum of the valences of $M_I$ and $M_{II}$, and Aromatic is a monocyclic aromatic compound having 6 to 12 carbon atoms.

Bimetallic salt complexes that have the generic formula $M_I M_{II} X_n$.Aromatic are known to be useful in the separation from gas mixtures of such complexible ligands as olefins, acetylenes, aromatics, and carbon monoxide. For example, in U.S. Pat. No. 3,651,159, Long et al. disclosed a process in which a sorbent solution of cuprous aluminum tetrahalide in benzene or toluene was used to separate ethylene, propylene, and other complexible ligands from a feed stream. The complexed ligands were recovered by ligand exchange with toluene. The resulting solution of cuprous aluminum tetrachloride.toluene in toluene was recycled and used to separate additional quantities of the complexible ligands from the feed stream. Walker et al. in U.S. Pat. No. 3,647,843 disclosed a process in which a hydrocarbon pyrolysis gas stream was contacted with a cuprous aluminum tetrachloride solution in toluene to separate acetylene from the gas stream as a solution of the complex $HC \equiv CH.CuAlCl_4$ in toluene. Acetylene was stripped from this complex, and the resulting cuprous aluminum tetrachloride.toluene complex was recycled to the absorption column.

In the commercial applications of these and similar processes, large volumes of gas mixtures containing the complexible ligands are passed at high rates through absorption columns that contain the liquid sorbents. The volume of the gas mixtures that can be processed in this way is greatly reduced if the sorbent foams to an appreciable extent since such foaming may cause column stacking and carry-over of the sorbent into the gas lines. While the causes of foaming in such processes are not fully understood, it has been observed that recycled liquid sorbent generally has a greater tendency to foam than does freshly-prepared liquid sorbent.

In accordance with this invention, it has been found that the foaming that often occurs when a liquid sorbent comprising a bimetallic salt complex having the generic formula $M_I M_{II} X_n$.Aromatic, wherein $M_I$ is a Group I-B metal, $M_{II}$ is a Group III-A metal, X is halogen, n is the sum of the valences of $M_I$ and $M_{II}$, and Aromatic is a monocyclic aromatic compound having 6 to 12 carbon atoms, is brought into contact with large volumes of gas can be minimized or prevented by incorporating in the sorbent a small amount of a paraffinic hydrocarbon.

The paraffinic hydrocarbons that can be used as the antifoaming agents in processes in which a gas stream containing complexible ligands is brought into contact with a liquid sorbent having the generic formula $M_I M_{II} X_n$.Aromatic are those that are obtained by the fractional distillation of petroleum and that have from 5 to 25 carbon atoms. A single paraffinic hydrocarbon, such as pentane or dodecane, or a mixture of two or more of these hydrocarbons, such as mineral oil or lubricating oil, can be used in the practice of this invention. Illustrative of the useful paraffinic hydrocarbons are those given in Table I.

Table I

| Paraffinic Hydrocarbon | Formula | Boiling Range (°C.) |
|---|---|---|
| Pentane | $C_5H_{12}$ | 36 |
| Octane | $C_8H_{18}$ | 125 |
| Naphtha, Ligroin | $C_5H_{12}$—$C_7H_{16}$ | 20–100 |
| Gasoline | $C_6H_{14}$—$C_{12}H_{26}$ | 70–200 |
| Naphtha | $C_{10}H_{22}$—$C_{14}H_{30}$ | 175–250 |
| Kerosene | $C_{12}H_{26}$—$C_{15}H_{32}$ | 200–275 |
| Gas oil | $C_{15}H_{32}$—$C_{18}H_{38}$ | >275 |
| Lubricating oil, paraffin oil, mineral oil | $C_{16}H_{34}$—$C_{20}H_{42}$ | |
| Greases | $C_{18}H_{38}$—$C_{22}H_{46}$ | >275 |
| Paraffin wax | $C_{20}H_{42}$—$C_{25}H_{52}$ | >275 |

Each of the paraffinic hydrocarbons having from 5 to 25 carbon atoms can be used as the antifoaming agent in the liquid sorbent. The preferred antifoaming agents are the normal paraffinic hydrocarbons that have from 12 to 20 carbon atoms. Because these hydrocarbons are liquid at ambient temperatures, they are easy to handle and to use; their low volatility insures that their loss during the recycling of the sorbent will be minimal. Particularly advantageous results have been obtained in the process of this invention using mineral oil, paraffin oil, and lubricating oils, such as non-detergent motor oil, as the anti-foaming agent. When lower molecular weight materials, such as pentane, are used, the control of foaming may be of short duration because of the volatility of the hydrocarbon. The higher molecular weight materials, which are grease or solids at ambient temperatures, are often difficult to handle and to incorporate into the sorbent solution. The paraffinic hydrocarbons do not adversely affect any of the properties of the liquid sorbent, and they appear to be chemically inert in the system.

Only a small amount of the paraffinic hydrocarbon need be used to prevent the foaming of the liquid sorbent. In most cases, from about 0.2 to 2 percent, based on the weight of the sorbent, of the antifoaming agent will minimize or prevent foaming. When the antifoaming agent is mineral oil, paraffin oil, or a lubricating oil, best results are obtained when 0.5 to 1 percent, based on the weight of the sorbent, of the antifoaming agent is used.

The bimetallic complexes that are present in the liquid sorbents into which the antifoaming agents are incorporated have been defined herein as having the generic formula $M_I M_{II} X_n$.Aromatic. $M_I$ is a Group I-B metal; that is, copper, silver, or gold. Copper (I) is the preferred metal. $M_{II}$ is a Group III-A metal; that is, boron, aluminum, gallium, indium, or thallium. Boron and aluminum are the preferred metals, aluminum being particularly preferred. X is halogen, i.e., fluorine, chlorine, bromine, or iodine; it is preferably chlorine or bromine. Aromatic is a monocyclic aromatic hydrocarbon having 6 to 12 carbon atoms, and preferably 6 to 9 carbon atoms, such as benzene, toluene, ethylbenzene, xylene, or mesitylene. It is preferably toluene. Illustrative of these bimetallic complexes are the following: $CuBF_4$.benzene, $CuBCl_4$.benzene, $AgBF_4$.mesitylene, $AgBCl_4$.xylene, $AgAlCl_4$.xylene, $AgAlBr_4$.benzene, $CuGaCl_4$.toluene, $CuInI_4$.xylene, $CuThI_4$.mesitylene, and the like. The preferred bimetallic salt complexes are $CuAlCl_4$.toluene and $CuAlBr_4$.toluene.

The liquid sorbents are usually and preferably solutions of the aforementioned bimetallic salt complexes in an aromatic solvent. The aromatic solvent is preferably the same as the aromatic compound used in the preparation of the bimetallic salt complex, but it may be a different one. The total amount of aromatic compound in the liquid sorbents, that is, the amount in the complex and the amount used as solvent, is at least 10 mole percent of the amount of the bimetallic salt $M_I$-$M_{II}X_n$ that is present. It is preferred that the aromatic compound be 100 to 250 mole percent of the amount of the bimetallic salt. The liquid sorbents usually have specific gravities between 1.20 and 1.35.

The liquid sorbents are prepared by mixing and reacting the appropriate metal halides in a reaction medium that is benzene, toluene, ethylbenzene, xylene, mesitylene, or another aromatic hydrocarbon. The reaction may be carried out at a temperature between about −40°C. and the boiling point of the aromatic hydrocarbon at a pressure between 0.1 atmosphere and 100 atmospheres. It is preferably carried out at a temperature between 10°C. and 50°C. at 1 atmosphere to 10 atmospheres pressure. Equivalent quantities of the $M_I$ halide and the $M_{II}$ halide or a small excess of one of these halides can be used. Since the $M_I$ halide, unlike the $M_{II}$ halide and the bimetallic salt complex, is not soluble to an appreciable extent in the aromatic hydrocarbon, any unreacted $M_I$ halide can be readily separated from the liquid sorbent, for example, by filtration or decantation.

This invention is further illustrated by the following examples.

EXAMPLE 1

A. A liquid sorbent that contained 28.6 mole percent of cuprous aluminum tetrachloride and 71.4 mole percent of toluene was prepared by adding 1.1 moles of cuprous chloride to 1 mole of anhydrous aluminum chloride in toluene. The resulting solution was filtered to remove unreacted cuprous chloride and insoluble impurities from it.

B. An acetylene process off-gas that contained about 30 percent of carbon monoxide and 70 mole percent of hydrogen and methane was fed at ambient temperature and about 5 atmospheres pressure into an absorption column. On entering the column, the gas was contacted with an amount of the liquid sorbent of Example 1A that contained at least sufficient cuprous aluminum tetrachloride to react with all of the carbon monoxide in the acetylene process off-gas. The carbon monoxide in the gas mixture reacted with the solvent as it traveled through the column to form a solution of the carbon monoxide-cuprous aluminum tetrachloride complex in toluene. This solution was fed into a stripping column in which it was brought into contact with toluene vapor at 110°C. The mixture of toluene vapor and carbon monoxide that left the column was cooled to 25°C. to condense the toluene and to separate it from the carbon monoxide. The stripped sorbent was returned to the absorption column where it reacted with additional amounts of carbon monoxide.

C. The freshly-prepared liquid sorbent did not foam appreciably during the operation of the process described in Example 1B. After it had been used for several weeks, however, it had acquired a marked tendency to foam. Because of the foaming, which caused column stacking and solvent carry-over into the gas overhead lines, it was necessary to greatly reduce the rate at which the gas stream was fed into the absorption column.

EXAMPLE 2

A series of tests was carried out to evaluate a number of materials as antifoaming agents in the liquid sorbent resulting from the procedures described in Example 1.

The following test procedure was used: A 100 ml. sample of untreated liquid sorbent or of sorbent that contains a test compound is charged to a 500 ml. graduated cylinder that measures 270 mm. between the zero mark and the 500 ml. mark and which has an internal diameter of 45 mm. During the test period, nitrogen is passed through a coarse glass frit measuring 2 cm. and through the sorbent at the rate of 1.5 liters per minute for 5 minutes while the sorbent is at 22°C. The height of the foam in mm. starting at the 100 ml. mark is taken as a measure of the foaming tendency of the sorbent.

The sorbent used in these tests was prepared by the procedure described in Example 1A. It had been used in the process described in Example 1B for four weeks, and it had a foaming height of 270 mm. The antifoaming agents used and the results obtained are given in Table II.

Table II

| Antifoaming Agent | Level | Height of Foam* (mm.) |
| --- | --- | --- |
| Pentane | 1% | <1 |
| Octane | 1% | <1 |
| Naphtha | 1% | <1 |
| Mineral Oil | 0.5% | <1 |
| Mineral Oil | 1% | <1 |
| None | — | 270 |

* When pentane was used, the reduction of foaming was short-lived due to volatilization of the pentane. When mineral oil was used, there was no foaming even after the test had been continued for 6 hours with continuous nitrogen flow.

EXAMPLE 3

A liquid sorbent which had been prepared by the process of Example 1A and which had been used for several weeks in the process described in Example 1B had a foam height of 270 mm. When a mixture of 1 gallon of mineral oil and 1 gallon of toluene was added for each 100 gallons of sorbent and the resulting treated sorbent was used in the process of Example 1B for 2 hours, the foam height of the treated solution was less than 10 mm. When the sorbent was used in the process for an additional 48 hours, its foam height remained less than 10 mm.

EXAMPLE 4

To 25 gallons of a liquid sorbent which had been prepared by the process of Example 1A and which had a foam height of 20 mm. was added 2 quarts of nondetergent motor oil (Tenneco). The resulting treated sorbent had a foam height of less than 10 mm. When this sorbent was used for two days in the process described in Example 1B, there were no foaming problems even when the rates of gas flow and solvent flow were greatly increased.

COMPARATIVE EXAMPLE

Using the procedure described in Example 2, a number of materials were evaluated as antifoaming agents for the liquid sorbent whose preparation is described in Example 1A. The materials tested and the results obtained are given in Table III. Because the samples of the liquid sorbent used had different tendencies to foam, the heights of foam before and after the addition of the test materials are given.

Table III

| Antifoam Agent | Level | Height of Foam (mm.) Before Treatment | Height of Foam (mm.) After Treatment |
| --- | --- | --- | --- |
| Dimethyl ether | 200 ml. | 18 | 15 |
| Methanol | 1 ml. | 18 | 15 |
| Benzene | 1 ml. | 18 | 18 |
| Sodium Sulfite | 1 g. | 18 | 10 |
| Aqueous NH$_4$OH (Conc.) | 1 ml. | 18 | 10 |
| Acetone | 1 ml. | 18 | 10 |
| Isopropanol | 1 ml. | 18 | 10 |
| Air | 100 l./hr. for 6 hrs. | 18 | 18 |
| Water | 1 ml. | 18 | 18 |
| Dow Corning Antifoam A (nonaqueous) | 1 drop | 65 | 120 |
| Dow Corning Antifoam B (nonaqueous) | 1 drop | 75 | 75 |
| Dow Corning Antifoam Q (aqueous) | 1 drop | 110 | 220 |
| Dow Corning Antifoam H-10 (aqueous) | 1 drop | 100 | 95 |

What is claimed is:

1. In a process for separating at least one complexible ligand selected from the group consisting of aromatic compounds, olefins, acetylenes, carbon monoxide, and mixtures thereof from a feed steam containing said ligand which comprises contacting the feed stream with a liquid sorbent having the formula $M_I M_{II} X_n$.Aromatic, wherein $M_I$ represents a Group I-B metal, $M_{II}$ represents a Group III-A metal, X represents halogen, n is the sum of the valences of $M_I$ and $M_{II}$, and Aromatic represents a monocyclic aromatic compound having 6 to 12 carbon atoms, thereby forming a complex of the sorbent and the complexible ligand and separating said complexible ligand from said complex, the improvement that comprises incorporating in the liquid sorbent about 0.2 to 2 percent, based on the weight of the sorbent, of an antifoam agent that is a paraffinic hydrocarbon having from 5 to 25 carbon atoms.

2. The process of claim 1 wherein the antifoam agent is a paraffinic hydrocarbon having 12 to 20 carbon atoms.

3. The process of claim 1 wherein the antifoam agent is mineral oil.

4. The process of claim 1 wherein the antifoam agent is lubricating oil.

5. The process of claim 1 wherein the antifoam agent is non-detergent motor oil.

6. The process of claim 1 wherein the antifoam agent is pentane.

7. The process of claim 1 wherein 0.5 to 1 percent, based on the weight of the sorbent, of the antifoam agent is incorporated into the liquid sorbent.

8. The process of claim 1 wherein the liquid sorbent comprises a CuAlX$_4$.Aromatic complex.

9. The process of claim 1 wherein the liquid sorbent is a solution of CuAlCl$_4$.toluene in toluene.

10. The process of claim 1 wherein the complexible ligand is carbon monoxide.

* * * * *